INVENTOR.
Russell Persons
BY
William M. Yates
ATTORNEY

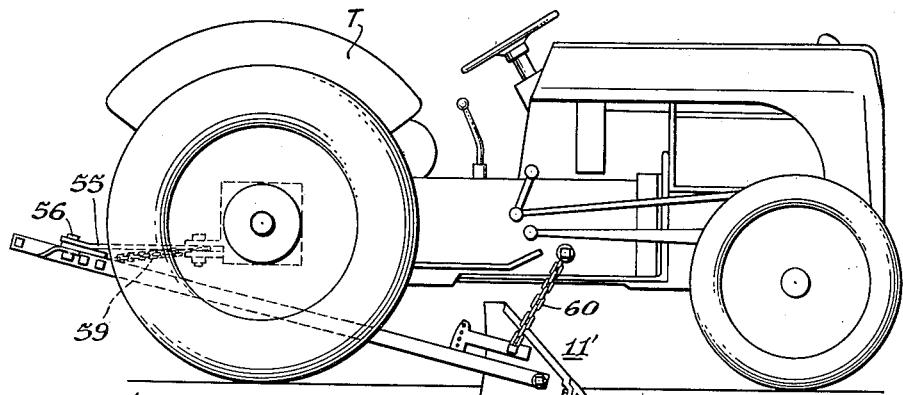
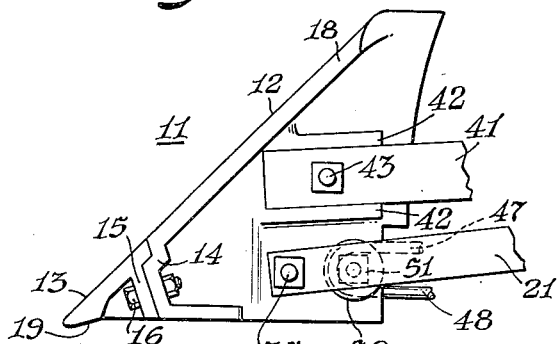 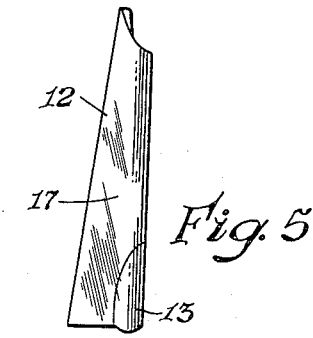
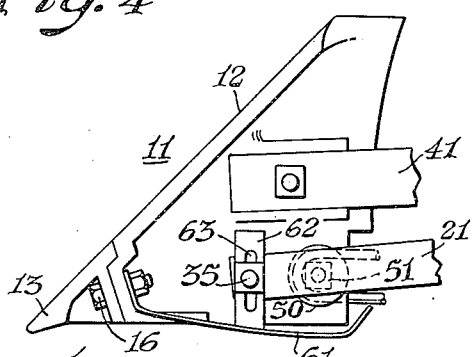 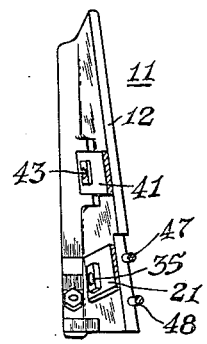

Patented Aug. 31, 1954

2,687,605

UNITED STATES PATENT OFFICE 2,687,605

BEET LIFTER

Russell Persons, Hemlock, Mich.

Application September 22, 1949, Serial No. 117,191

2 Claims. (Cl. 55—106)

This invention relates to a lifter for harvesting sugar beets and similar root vegetables grown in rows. It also concerns a method of harvesting such vegetables.

Beet lifters of the types heretofore used commonly have runners which straddle the row and enter deeply into the soil at a level below the bottoms of the beets. As the lifter is drawn along, it cuts each beet loose from the soil and forces it bodily upward by pressure from beneath. Because of the depth at which they work, these lifters require a great deal of power and usually cannot be operated at all in dry, hard ground. They also leave the ground deeply grooved and covered with chunks of dirt, so that another operation is required to level it. By their nature, such lifters tend to damage many of the beets and may cut off portions of the larger ones, leaving them unharvested in the ground. Moreover, such lifters make no provision for cleaning the beets, or for delivering them into windrows, but simply dislodge them. They still must be picked up, cleaned of dirt, topped, and thrown into windrows, usually all by hand.

It is therefore an object of the present invention to avoid these difficulties by providing a beet lifter of simple, inexpensive construction which requires comparatively little tractive power, can be operated under any soil conditions, and leaves the ground smooth and level. Another object is to provide a lifter which shows no tendency to damage beets or leave portions unharvested, and which delivers them free of dirt into windrows. An additional object is to provide a lifter which will readily harvest beets even after they have been topped while still in the ground.

These and relates objects are realized in the beet lifter of the present invention, which operates on what is believed to be a new principle in harvesting root crops. In contrast to prior practice, no effort is made to cut the soil from around both sides of the beet or to apply upward pressure from a point below it. Instead, each beet is spun out of the soil by applying to it at or slightly below the level of its shoulder, i. e. its greatest circumference, a force directed tangentially to one side only of the beet and having a slight upward component. Such a force rotates or twists the beet through a sufficient angle to free it cleanly from adhering soil and then lifts it gently to the top of the ground.

In the invention, the application of this force to the beets to be lifted is accomplished by a plowblade having a substantially plane rearwardly-extending working surface which is disposed at a small acute angle to the direction of travel and to the vertical. A suitable framework for attachment to a tractor or other draft appliance holds this plowblade at the appropriate position and depth relative to the beets, as will be explained in detail. For most effective operation, two opposed blades are mounted on the same framework to lift two rows of beets simultaneously and deliver them to a common windrow.

The invention, in a preferred embodiment, may best be understood with reference to the accompanying drawings, in which Fig. 1 is a perspective view of the assembled lifter, with two opposed blades;

Fig. 4 is an enlarged partial side elevation, showing the rear face of the blade of Fig. 3;

Fig. 5 is a front elevation of the blade of Figs. 3 and 4;

Fig. 6 is a rear elevation of the blade of Figs. 3 and 4;

Fig. 7 is a side elevation, exemplifying one way of attaching the lifter to a tractor;

Fig. 9 is a side elevation similar to Fig. 4, but illustrating an alternative construction, using a ground shoe to limit the working depth of the lifter blade.

Figure 1:
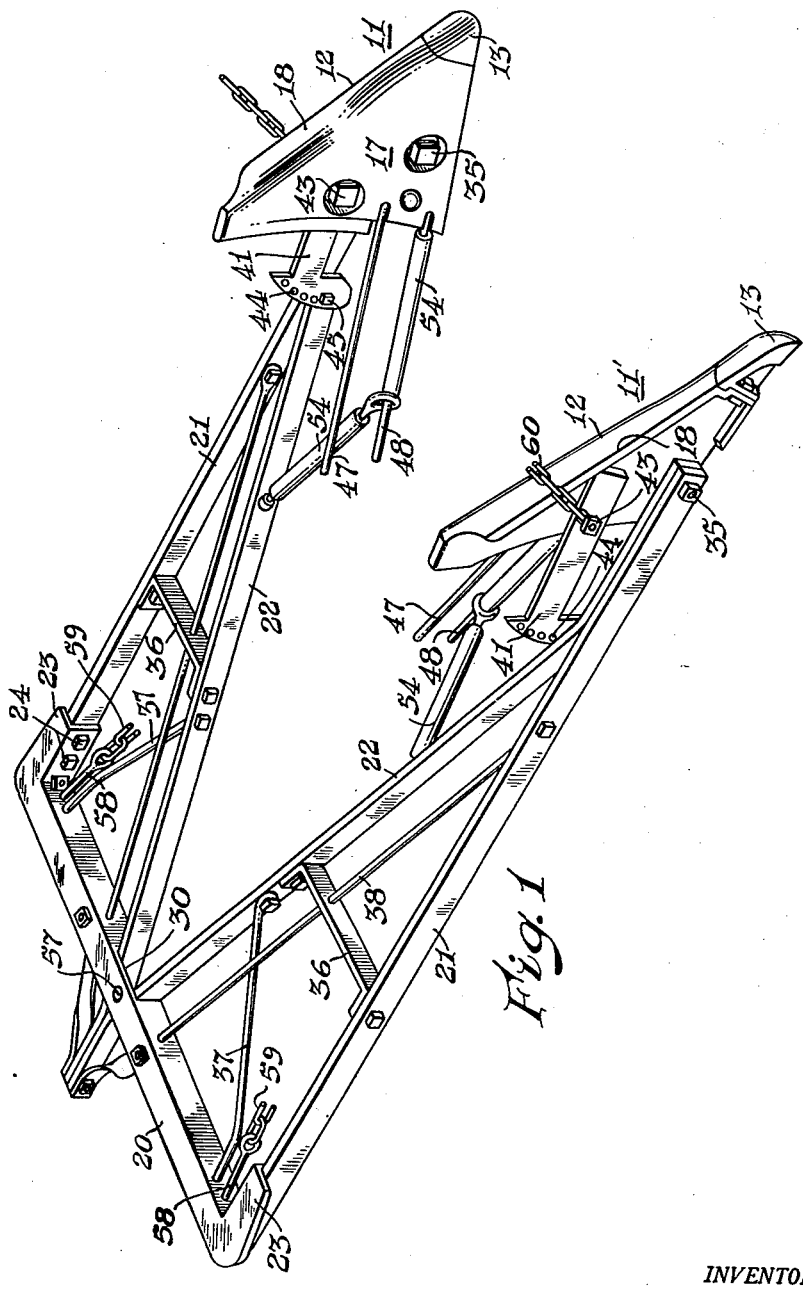

With the implement illustrated in the drawings, beets are lifted from two rows simultaneously by means of two oppositely formed blades indicated generally as 11 and 11'. As shown, each blade is roughly in the form of a right isosceles triangle with one of the equal sides at the bottom and nearly paralleling the ground. Each blade is, for convenience, made of two steel castings, the rear casting 12 being the larger and formed to mate with the front casting 13, which is a replaceable point. The two are held fixed relative to one another by means of interlocking edge ribs 14 and 15 along their outer faces, through which extends a bolt 16 (Fig. 4).

Each blade 11 or 11' is formed with a substantially plane smooth working face 17 which extends rearwardly and constitutes the inner side of the blade. This face terminates along its upper edge in a smoothly-rounded shoulder 18 which, at its forward end, merges into the rounded point 13. The rear casting 12 is tapered in breadth, being broader at the rear than at the front, so that the inner or working face 17, when viewed from above, is at an acute angle to the outside face (Fig. 2), such angle being usually from 5° to 15°. The casting 12 is also formed wider at the bottom than at the top, so that the working face 17, when viewed from in front, is also at an acute angle to the rear face (Figs. 5 and 6).

As shown in Fig. 4, the front casting or point 13 terminates in a sharp tip which is undercut, as at 19, to reduce drag and to insure that the blade bites into the ground. The point 13 may advantageously be formed of wear-resistant metal.

Figure 2:
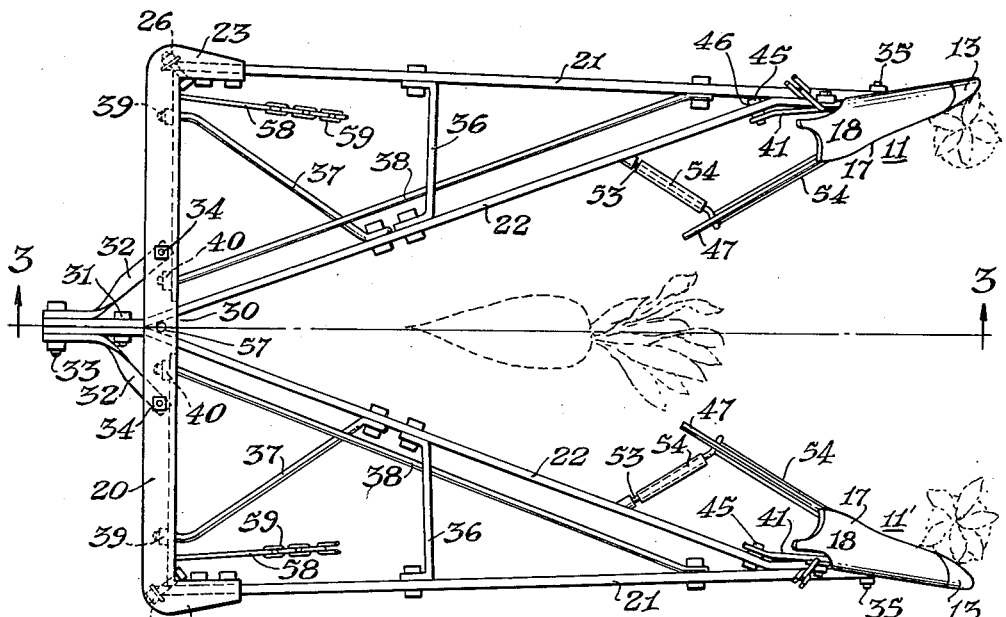
Fig. 2 is a plan view, on a reduced scale, of the lifter in operation, illustrating its windrowing action.
Figure 8:
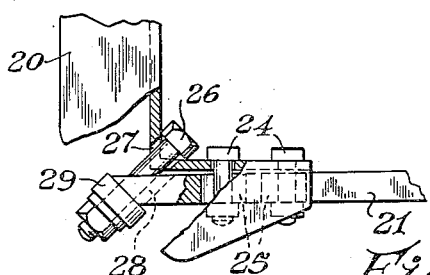
Fig. 8 is an enlarged cutaway plan view of the detail at the rear corner of the lifter framework.

The blades 11 and 11' are supported by and held adjustably in proper position relative to the ground by a double triangular framework consisting essentially of a rear yoke or crossbar 20, sidebars 21, and oblique centerbars 22 (Figs. 1 and 2). The crossbar 20 is made of angle iron, shaped at each end to form forwardly-extending side arms 23. The sidebars 21, at their rear ends, are held firmly to these side arms 23 by bolts 24 which pass through elongated adjusting slots 25 in the sidebars (Fig. 8). The thrust from each sidebar 21 is carried to the crossbar 20 by a bolt 26 extending cornerwise through a hole 27 in each back corner of the crossbar. This bolt passes through a notch 28 in the end of the sidebar and seats against a washer 29 which bears against this end.

The center bars 22 are not attached directly to the crossbar 20 but instead pass through a notch 30 cut in the web of the crossbar at its center (Figs. 1 and 2). At their rear ends, the two centerbars 22 meet and are bent to lie flat against each other, being held together by a bolt 31 extending through both of them. The thrust from the centerbars 22 is carried to the crossbar 20 by straps 32 which are secured to the abutting ends of the centerbars by a bolt 33 passing through the bars and to the crossbar by other bolts 34.

At their front ends, the centerbars 22 meet the sidebars 21 and are bent to lie flat against the latter, being held together by bolts 35, which also serve to support the blade castings 12, as will be later described. Rigidity of the truss formed by each sidebar and centerbar is insured by a brace 36, one end of which is bolted to each of the two members near their midpoints.

Angular adjustment of each sidebar 21 and centerbar 22 relative to the crossbar 20 is made by control rods 37 and 38. Each rod 37 is bolted to the centerbar 22 near the middle. At its other end, the rod passes through a hole in the web of the crossbar 20 near the outer edge and terminates in a threaded portion to receive an adjusting nut 39. Each control rod 38 is bolted to the sidebar 21 near its front. At its other end, this rod passes through a hole in the web of the crossbar 20 near the middle of the latter, and also ends in a threaded portion to receive an adjusting nut 40. By simultaneously adjusting both pairs of nuts 39 and 40, the front ends of the two sidebars 21 can be drawn closer together or farther apart, thus controlling the spacing between the two plowblades 11 and 11'.

As previously stated, each blade casting 12 is mounted on the corresponding sidebar 21 and centerbar 22 at their juncture near the front by a bolt 35. As shown particularly in Figs. 1, 3, and 4, this bolt penetrates the casting near the bottom center, the inner end of the bolt being countersunk in the working face 17 to avoid forming a projection on it. The casting 12 is also secured to its supporting frame by an adjustable sector arm 41, the bar-like forward end of which fits into a socket formed on the rear face of the casting 12 by two ribs 42. A bolt 43, penetrating both the arm and the casting and countersunk on the inner casting face 17, holds the sector arm 41 rigidly to the casting 12. The rear portion of the sector arm 41 is enlarged and formed with a plurality of adjusting holes 44 along an arc the center of which is the bolt 35. An adjusting bolt 45 passes through one of the holes 44 and a registering hole 46 in the centerbar 22 to maintain the sector arm and centerbar in fixed relation. By selecting which of the holes 44 is used for the adjusting bolt 45, the angle of tilt of the entire plowblade 11 relative to the ground can be controlled. Ordinarily, the bottom edge of the blade makes an angle of 5° to 10° with the ground. By inserting one or more washers (not shown) around the bolt 45 between the sector arm and the centerbar, the angle which the inner blade face 17 makes with the direction of travel can be adjusted. In general this angle is of the order of 5° to 20°.

Figure 3:
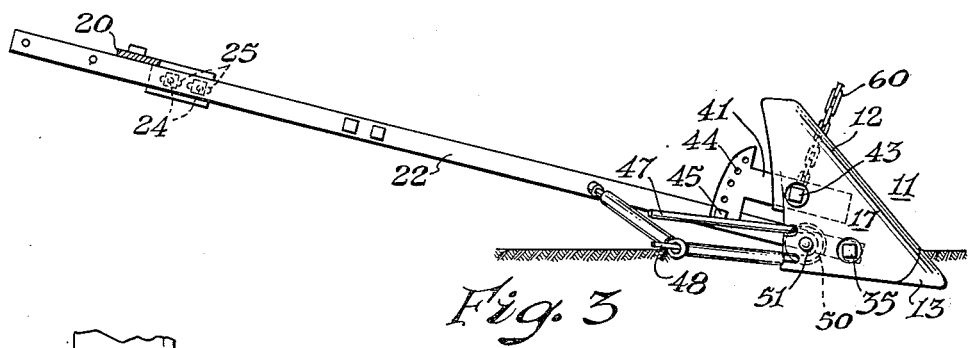
Fig. 3 is a partial side elevation of the lifter, taken on line 3—3 of Fig. 2, showing the inner or working face of the right-hand blade of Fig. 1 in operating position in the ground.

Also associated with each plowblade 11 are a pair of delivery rods 47 and 48 which are spaced apart a distance less than the diameter of a beet. These rods pass through holes in the blade casting 12 near the bottom and terminate behind the rear face in an integral U-loop where they are held secure by a washer 50 and bolt 51 (Figs. 3 and 4). From the working face 17 of the blade, the delivery rods 47 and 48 extend rearwardly, inwardly and upwardly to form guides for transferring the beets, as they are lifted, from the blades 11 and 11' to a common windrow midway between them. Both delivery rods 47 and 48 are cantilevered and terminate near the center of the framework. Added stiffness is provided by eyebolt braces 53 which encircle the lower rods 48 near their front ends and pass through the centerbars 22. The front portions of the lower rods 48 and the eyebolts 53 are encased loosely in short pieces of pipe 54 to give them added stiffness and to present a more rounded surface to the beets.

The manner in which the entire beet lifter assembly is attached to a tractor T is illustrated in Fig. 7. As there shown, the plowblades 11 and 11' are beneath the center of the tractor. The crossbar 20 of the lifter frame is held securely to the conventional tractor rear drawbar 55 by a kingbolt 56 which passes through a hole in the center of the drawbar 55 and a like hole 57 in the center of the crossbar 20. The rear corners of the crossbar 20 are also connected by eyebolts 58 to chains 59, the other ends of which are secured to the tractor in any convenient way.

The plowblades 11 and 11' are also provided with chains 60 which encircle the bolts 43 and extend upwardly to attach to the tractor near the middle. The purpose of these chains is to limit the depth to which the blades 11 and 11' enter the ground. This depth is readily adjusted by altering the length of the chains 60, and is always a small fraction of the total height of the plowblade.

An alternative arrangement for limiting the depth of the blade is shown in Fig. 9. In this case, a horizontal spring steel shoe or skid 61 has a forward projection by which it is secured to the bolt 16. An upward projection 62 has a slot 63 which fits over the bolt 35. Vertical adjustment of the projection 62 controls the position of the shoe 61. This shoe is made broad enough to ride on the ground surface adjacent to the blade and to prevent the point 13 from entering too deeply. The precise depth of entry can be adjusted by moving the projection 62 up or down.

In operation of the beet lifter of the drawings, the assembly is adjusted, by means of the sector arm 41, so that the inner working face 17 of each blade 11 or 11' is inclined at a small acute angle to the vertical and to the direction of travel, and so that the point 13 tends to enter the ground. The chains 60 are fixed so that the depth to which the point 13 enters the ground is small, preferably so that the tip of the point is at a level only slightly below that of the shoulders of the growing beets.

The framework is also adjusted, by means of the control rods 37 and 38, so that the distance between midpoints of the working faces 17 of the opposed blades 11 and 11' is approximately equal to the distance between adjacent rows of beets.

For example, with sugar beets, the lower edge of the blade 11 may be about 12 inches long. The depth of penetration of the point 13 is two or three inches. When the beets are planted in rows 28 inches apart, the tips 13 of the opposed blades 11 and 11' are best set so that they are about 34 inches apart, while the distance between the lower rear corners of the blades is about 26 inches. Under these conditions, the blades should be tilted outwardly so that the upper rear corners are about 29 inches apart.

With the lifter thus adjusted, the tractor is driven down the rows of beets so that the blades 11 and 11' straddle two adjacent rows equally. As the blades are dragged through the ground, each blade applies to the ground a force which is tangential to the outside of each beet in the row. This force has a slight upward component due to the contour of the working face of the blade and is applied to each beet at about or just below its shoulder. Hence, as the blade approaches each beet, the tangential component rotates or twists it slightly, about a quarter turn, loosening it in the ground and freeing it from adhering earth. The upward component of the force slowly lifts the beet to the surface of the ground, where it lies flat for a brief instant. The delivery rods 47 and 48 then encounter the beet and move it gently inward to the common windrow between the two blades.

While the action of the blades has been described in detail, the time interval involved for any one beet is extremely short. It is customary to drive the tractor at a speed of several miles an hour. Under these conditions, all that the eye can see is that the blades proceed down the rows of beets, while the individual beets appear to be twisted upwardly and to pop out of the soil, being carried rapidly into the windrow. As contrasted to lifters used heretofore, only a small amount of power is required, and the beets are delivered to the top of the ground and are free of adhering dirt. In addition, the earth is left almost smooth, instead of deeply furrowed, so that a subsequent soil-fitting operation is not required.

It will be appreciated that the foregoing description is intended as illustrative rather than limitative of the invention, and that other modes of applying the principles involved may be used within the scope of the following claims.

What is claimed is:

1. In an implement for lifting beets simultaneously from two adjacent rows, a draft frame comprising a rear crossbar having adjustably mounted thereon near each end thereof a forwardly-extending blade-holding triangular truss framework, braces extending from the crossbar to each framework adjustable for altering the distance between the forward ends of the two frameworks, a pair of oppositely formed plowblades, each roughly triangular in shape and increasing in breadth from front to rear and decreasing in thickness from bottom to top and having a substantially plane working face extending rearwardly from a tip, the working face of each blade being on the side nearest the opposing blade, means securing each plowblade pivotally to its respective framework near the forward end thereof, a sector arm extending rearwardly from each blade secured to the framework at a point rearward from the pivotal blade mounting, said pivotal mounting and sector arm being adjustable to hold each plowblade with its working face at a small acute angle to the direction of travel and to the vertical and its tip forward and downward in the direction of frame travel, and adjustable means attached to each blade limiting the depth of entry of each blade into the ground to a small fraction of its total height.

2. In an implement for mounting on a tractor to lift beets simultaneously from two adjacent rows, a draft frame comprising a rear crossbar adapted for attachment to the tractor drawbar, two oppositely-formed forwardly-extending blade-holding triangular truss frameworks adjustably mounted on the rear crossbar at the opposite ends thereof, braces extending from the crossbar to each framework adjustable for altering the distance between the forward ends of the two frameworks, a pair of oppositely formed plowblades, roughly triangular in shape and increasing in breadth from front to rear and decreasing in thickness from bottom to top and having a substantially plane working face extending rearwardly from a tip, the working face of each blade being on the side nearest the opposing blade, a delivery rod attached to and projecting inwardly, upwardly, and rearwardly from the face of each blade, an adjustable mounting on each framework near the forward end thereof holding one of the said plowblades with its working surface at a small acute angle to the direction of travel and to the vertical and its tip forward and downward in the direction of frame travel, and chains secured ot the tractor and to each truss framework adjusted in length to limit the depth of entry of each plowblade into the ground to a small fraction of its total height.

References Cited in the file of this patent

UNITED STATES PATENTS

| Number | Name | Date |
|---|---|---|
| Re. 13,215 | Shaw | Mar. 7, 1911 |
| 1,125,026 | Keller et al. | Jan. 12, 1915 |
| 1,195,578 | Goossen | Aug. 22, 1916 |
| 2,019,238 | Shiki | Oct. 29, 1935 |
| 2,073,939 | Lair | Mar. 16, 1937 |
| 2,330,743 | Rasmussen et al. | Sept. 28, 1943 |

FOREIGN PATENTS

| Number | Country | Date |
|---|---|---|
| 71,191 | Germany | Nov. 1, 1893 |
| 155,980 | Germany | Nov. 5, 1904 |
| 11,358 | Denmark | Oct. 3, 1908 |
| 424,730 | France | Mar. 20, 1911 |
| 520,415 | Germany | Mar. 11, 1931 |
| 855,708 | France | Feb. 19, 1940 |